(12) United States Patent
Missel

(10) Patent No.: US 7,006,454 B2
(45) Date of Patent: Feb. 28, 2006

(54) METHOD USED TO CREATE MULTIHOP RF NETWORK BASED ON LOW PERFORMANCE 8 BIT MICROCONTROLLERS

(75) Inventor: Felix Missel, Caracas (VE)

(73) Assignee: Smartmatic, Corp., Boca Raton, FL (US)

( * ) Notice: Subject to any disclaimer, the term of this patent is extended or adjusted under 35 U.S.C. 154(b) by 0 days.

(21) Appl. No.: 10/906,664

(22) Filed: Mar. 1, 2005

(65) Prior Publication Data
US 2005/0135328 A1    Jun. 23, 2005

Related U.S. Application Data

(63) Continuation of application No. 09/682,070, filed on Jul. 17, 2001, now abandoned.

(51) Int. Cl.
H04L 12/28    (2006.01)
H04J 3/24    (2006.01)

(52) U.S. Cl. .................. 370/256; 370/349; 340/825.53

(58) Field of Classification Search ................ 370/256, 370/349, 389, 392, 401, 408, 475; 340/2.1, 340/825.02, 825.52, 825.54; 709/222, 228
See application file for complete search history.

(56) References Cited

U.S. PATENT DOCUMENTS 4,081,612 A * 3/1978 Hafner ........................ 370/393
5,394,436 A * 2/1995 Meier et al. ................. 375/132
5,926,101 A * 7/1999 Dasgupta ............... 340/825.02

\* cited by examiner

*Primary Examiner*—Afsar Qureshi
(74) *Attorney, Agent, or Firm*—Jeffrey Furr

(57) ABSTRACT

This invention comprises a method to manage the efficient routing of messages in a multi-hop network. This method can be implemented using a low cost, low processing power hardware platform, whereby each network node consists of an 8-bit microcontroller and additional peripherals. The data storage unit is implemented by an external memory. This method uses four internal data buffers and an extremely efficient algorithm to manage traffic of messages and buffers within the microcontroller.

5 Claims, 6 Drawing Sheets

Message Transmission in a Multi-Hop Network

Single Node Hardware Architecture

Data Flow In Microcontroller

Architecture of Data Storage Unit

Header Fields

Message Transmission in a Multi-Hop Network

Request Response Algorithm

METHOD USED TO CREATE MULTIHOP RF NETWORK BASED ON LOW PERFORMANCE 8 BIT MICROCONTROLLERS

BACKGROUND OF INVENTION

1. Background Field of Invention

This invention relates to data transmission over a multi-hop RF network using low cost and low processing power 8-bit microcontrollers in order to overcome power limitations on the signal.

2. Background Discussion of Prior Art

A RF network is a group of nodes distributed in an irregular topography, every one within the power area of the other nodes.

Communication with a node through more than one node is known as a multiple-hop communication system.

In order to overcome the problems inherent to power limitations of the signal, some RF networks employ a net layer that improves the utilization of a method capable of sending a message hopping through nodes until it reaches the destination node.

These methods use one of two routing alternatives, and depending on which one is used, the method will be either table-based or dynamical routing-based. When a table-based method is employed, all routing information is stored in a data storage unit or DSU (118), so that when a node needs to send a message, the information stored in the DSU (118) is used in order to route that message. When a Dynamical routing-based method is employed, messages are routed dynamically, and a DSU is not needed. However, when the traffic of messages in the network becomes higher, a node that needs to send a message must send a broadcast in order to obtain the path of the destination node and afterwards send the message. Due to mobility, table-based methods must maintain the routing table up-to-date. Maintenance is performed through an algorithm that periodically updates the table. The utilization of high performance microcontrollers to manage complex routing algorithms has been widely used. In contrast, this invention is a method and a simplified, extremely efficient algorithm devised to update routing tables and thus allow nodes to communicate within a multi-hop network using low performance 8-bit Microcontrollers (114), achieving a significant reduction in the cost of devices used as nodes.

As is well known, low performance 8-bit microcontrollers have speed, storage and processing speed limitations, they are not well suited to be used in RF multi-hop network applications. However, based on this invention, low-cost devices may be developed and successfully perform as nodes in RF multi-hop networks.

SUMMARY OF THE INVENTION

This invention comprises a method to manage message routing in a multi-hop network. The hardware platform is an 8-bit microcontroller with additional peripherals. The data storage unit (118) is implemented by means of an external memory device.

This method uses four internal data buffers and an efficient algorithm within the microcontroller to manage said buffers.

OBJECTS AND ADVANTAGES

Accordingly, the objects and advantages of the present invention are:

a) To provide a wireless multi-hop network management scheme by means of a single 8-bit microcontroller, suitable for handling a substantial level of network traffic in spite of the processing power and memory limitations of said microcontroller.

b) To interface an external serial device with said multi-hop network.

c) To achieve a successful network operation based on a low cost device.

d) To be able to increase the network area, without having to increase the power of the signal.

LIST OF REFERENCE NUMERALS IN DRAWINGS

Figure 1:
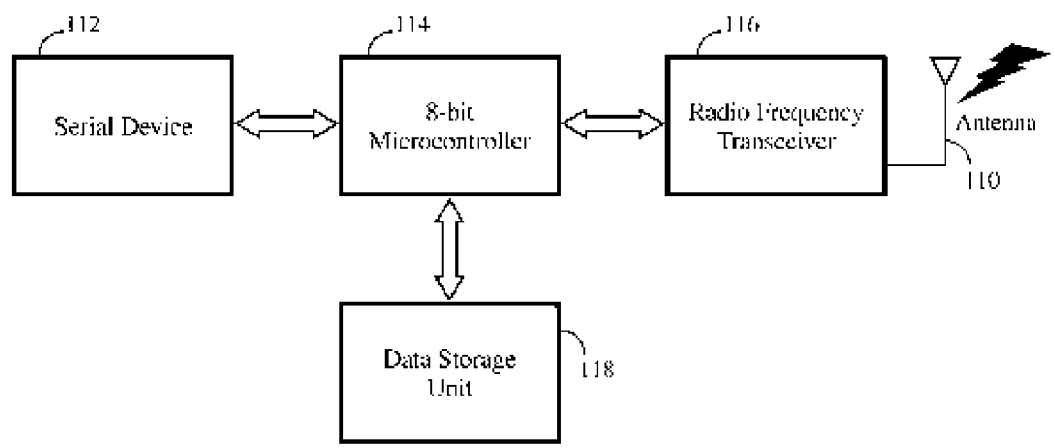
FIG. 1 shows the proposed hardware architecture for a single node.

110 Antenna.
112 Serial device.
114 8-bit microcontroller.
116 Radio frequency transceiver.
118 Data storage unit.
210 Serial device input buffer.
212 Auxiliary buffer.
214 Network input buffer.
216 Serial device output buffer.
218 Network output buffer.
310 Configuration data.
312*a*1 First node address in the table.
12*a*2 Second node address in the table.
312*a*3 Third node address in the table.
312*an* Nth-node address in the table.
410 Transmitter node address field.
412 Receiver node address field.
414 Sender node address field.
416 Destination node address field.
418 Length of the message field.
420 Frame tag field.
422 Request response field.
424 Data string field.
426 Cyclic redundancy check field.
510 Sender node.
512 Transmitter node.
514 Receiver node.
516 Destination node.
518 Message.
610 Flowchart start block.
612, 618, 622 Flowchart decision blocks.
614, 616, 620, 626, 628, 630 Flowchart process blocks.
624 Flowchart end blocks.

DETAILED DESCRIPTION

Each node uses as basic components: a microcontroller (114), a RF transceiver (116), a DSU (118) and a hardwired interface to communicate a serial device or SD (112) like a computer to the RF network.

Each node has two interfaces; one interface is node to a serial device, comprising an asynchronous data input and output, and having its own buffers (210 and 216). Another interface is a node to the network, having an input buffer (214) and an output buffer (218).

Figure 2:
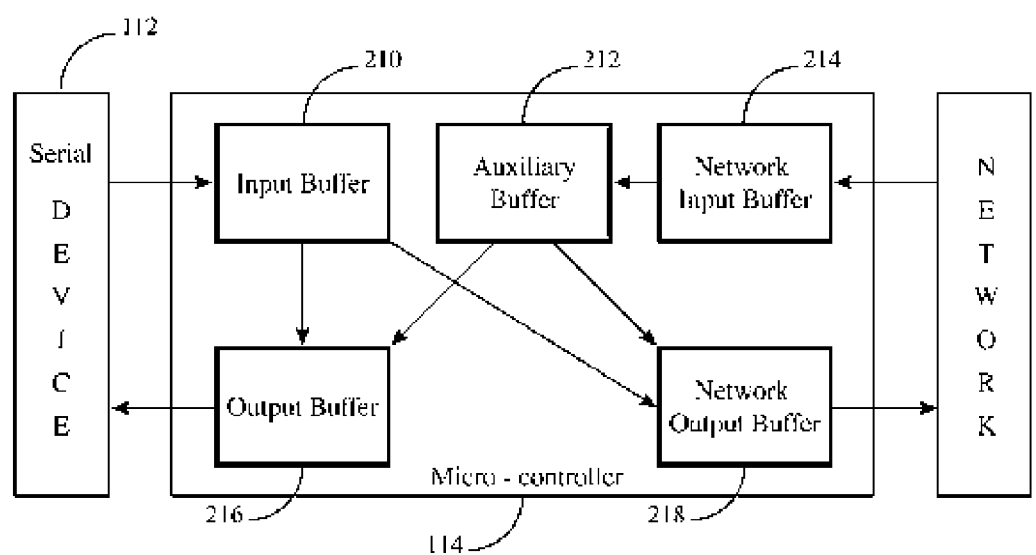
FIG. 2 shows the proposed data architecture of the microcontroller, and the data flow within same.
Figure 3:
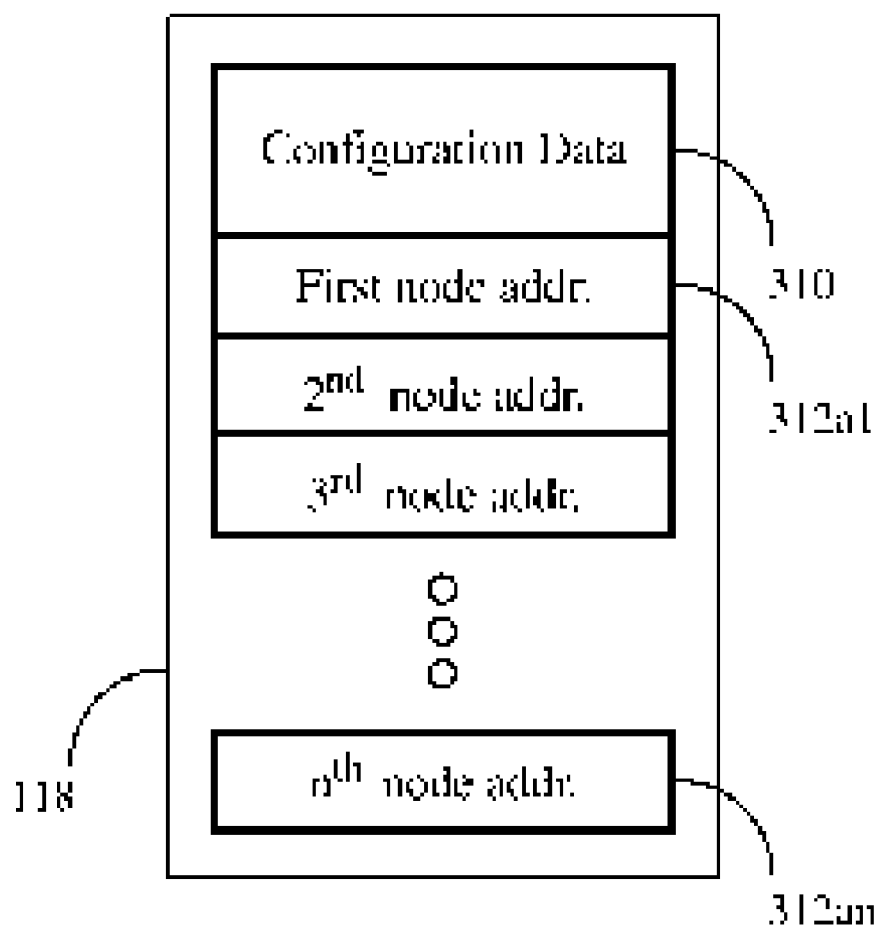
FIG. 3 shows the internal architecture of a data storage unit.
Figure 4:
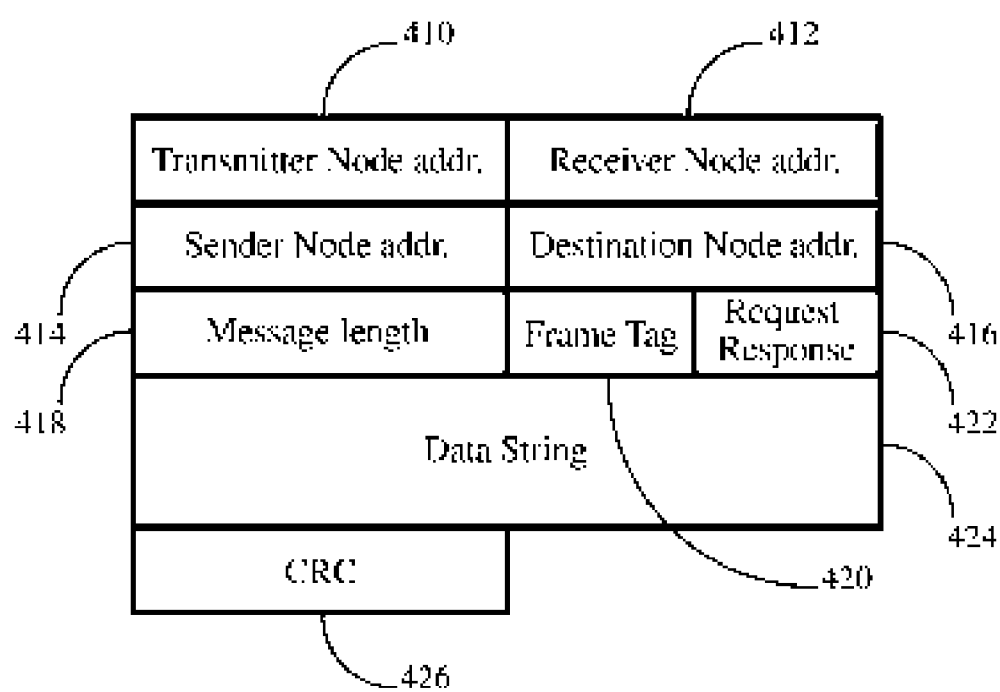
FIG. 4 shows the fields in the header.

The buffers are located internally in the 8-bit microcontroller (114) as shown in FIG. 2. The flow of the information goes through the buffers according to the message type.

Each node has one Data Storage Unit or DSU (118), located externally of the microcontroller. This DSU stores the address table, comprised by many node addresses or NA (312a1, 312a2, 312a3, until 312an, as there are n addresses), and the configuration data or CD (310).

A header is the beginning of the message. The header contains fields whose function is to route messages through a multi-hop network; such fields are employed to manage the flow of the message through the network. Therefore, in order to send a message through the multi-hop network, only four fields are needed: sender node address (414), transmitter node address (410), receiver node address (412) and destination node address (416).

The sender node address or SNA (414) contains the address of the node that originates the message. The transmitter node address or TNA (410) contains the address of the node that is transmitting the message; this address will change when the message goes through the network, becoming the address of the $n^{th}$ hop. The receiver node address or RNA (412) contains the address of the node that is receiving the message from the $n^{th}$ hop, and will be the $(n+1)^{th}$ hop in the next hop. The destination node address or DNA (416) contains the address of the last node that receives the message.

Some types of messages require an answer from the destination node, therefore, the header must contain a field indicating such condition, so there is a field named RR (422).

Additional Embodiments

There are additional fields in the header, reserved for use by the medium access control layer. These are: length or L (418), frame tag or FT (420), data string or DS (424) and cyclic redundancy check or CRC (426).

OPERATION OF THE INVENTION

Figure 5:
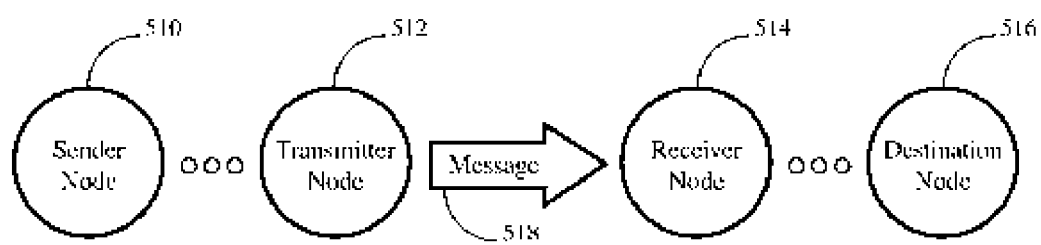
FIG. 5 shows a normal message transmission on a multi-hop network.

A normal communication in a multi-hop network proceeds as shown in FIG. 5. This scheme comprises a message hopping from node to node. At first a sender node or SN (510) sends a message. A transmitter node or TN (512), the nth hop transmits the message to the $(n+1)^{th}$ hop. A receiver node or RN (514), which is the $(n+1)^{th}$ hop receives the message in order to retransmit it; a destination node or DN (516), finally receives the message; and a message or M (518), is hopping through the network.

The operation of this invention comprises four cases, namely, when the message goes from the serial device to the network, from the serial device to the same serial device, from the network to the serial device, and from the network to the network.

In the cases where messages return to the same point, to either the serial device or the network, such messages are caused by network commands, and they are intended to makes changes to the configuration data in the DSU (118). Therefore, the message is replied by the node itself and the response is sent back to the sender, which can be a node or the serial device.

When the message goes from the serial device to the network, the data is received from the serial device and stored in a buffer called serial device input buffer or SDIB (210), then the message is copied, following its processing, to a transmission buffer or network output buffer NOB (218), and is sent through the network.

When the message goes from the serial device to the same serial device, the data is received from the serial device and stored in the serial device input buffer or SDIB (210), then the message is copied, following its processing, to a serial device output buffer or SDOB (216), and goes to the serial device (112).

When the message goes from the network to the serial device, the data is received from a buffer called network input buffer NIB (214) and is stored in a buffer called auxiliary buffer or AB (212), such that before any processing, the message is copied, to the SDOB (216), and goes to the serial device (112).

When the message goes from the network to the network, the data is received from the NIB (214), then is copied to the AB (212), such that before any processing, the message is copied, to the NOB (218), and is sent through the network. This case can also be the result of a retransmission of a message.

Figure 6:
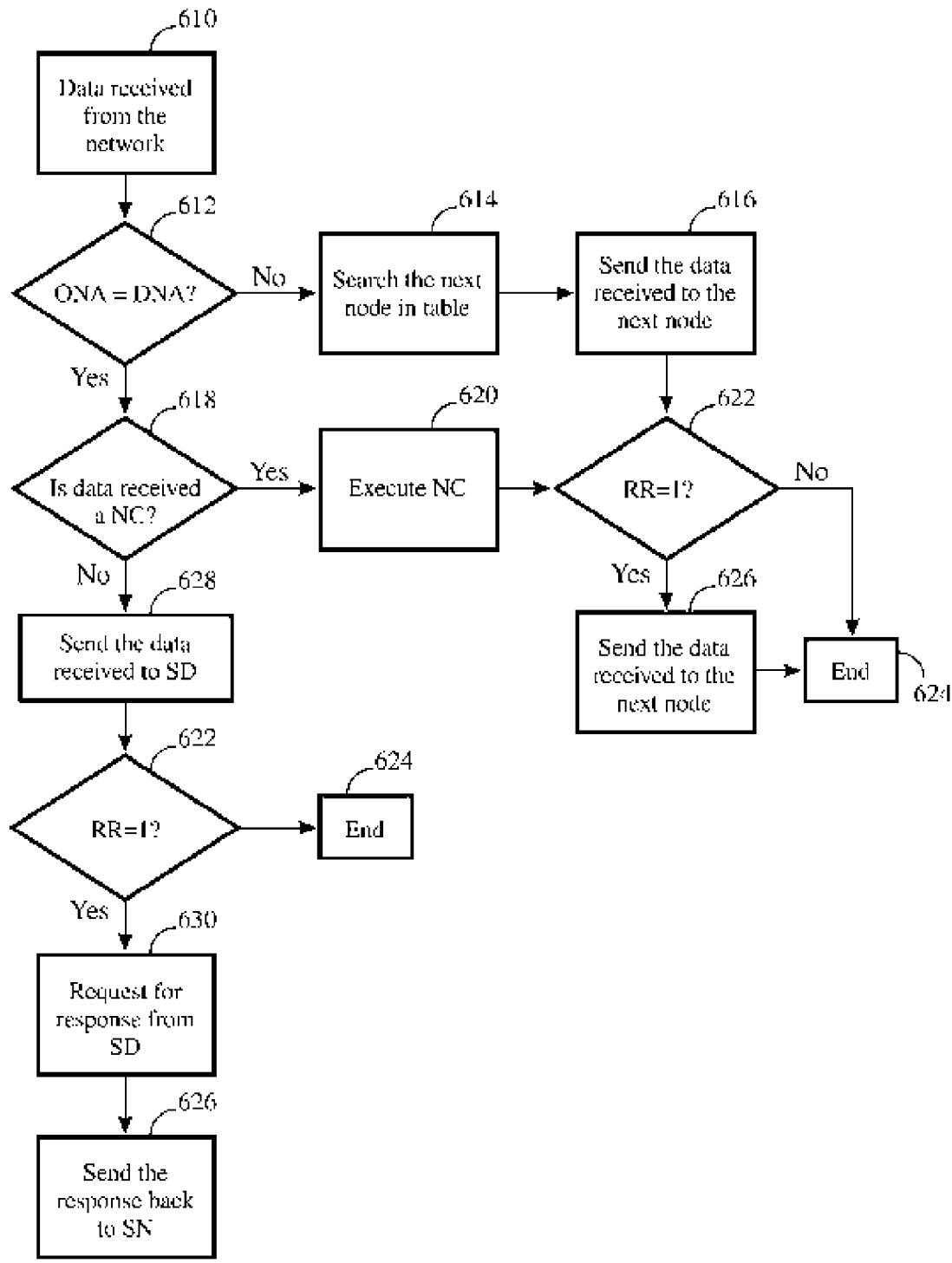
FIG. 6 shows the request response functionality algorithm.

In order to ensure the request response functionality, this invention involves the utilization of the algorithm shown in FIG. 6.

This algorithm works as follows. When a message is received from the network (610), the destination node address (416) is compared with its own node address (612). If the comparison does not match, this means that a message is being retransmitted, then the node searches for the next hop (614) and retransmits the message (616). If the comparison matches, the message is tested to determine if it is a network command or NC (618). If the message is a NC, the NC will be executed by the node (620). Then the RR (422) field is tested (622). If a response is required, the node sends a message back to the sender node (626) and subsequently ends (624). If no response is required, execution ends (624). When the message is not a NC, then the message is sent to the serial device (628). Then the RR (422) is tested (622). If the response is required, the node sends a request response message to the serial device (630), and after the serial device answers back, the node sends this answer back to the sender node (626). If no response is required, then execution ends (624).

The automatic creation of the table is the most important processes because the table, once completed, can accept few changes; one of these changes could be the arrival of a new node in the network.

In order to illustrate the algorithm of automatic creation of the table, let be a node surrounded by neighbors and all of these are in turn surrounded by distant neighbors.

A first node sends its update table to everybody, then neighborhood nodes send acknowledge messages to the sender. The sender sorts neighborhood nodes by their addresses, then the sender requires of each one of the nodes in the neighborhood its node address table in order to complete the entire network. If a neighbor does not send an acknowledgement message, it will then appear as a node behind one neighbor, however this error condition will disappear when these nodes exchange messages between them. Once the first node has a complete table, it sends messages to each node in the network, in order to include its own address in others' node tables.

CONCLUSION, RAMIFICATION AND SCOPE OF INVENTION

This invention is suitable for developing low cost communication devices on a RF medium, because it allows the use of low cost microcontrollers and low cost transmitters. Moreover, a device that uses this method can be easily connected to a serial device, for example: a computer, with a minimal of technical knowledge. Therefore, it is possible to make a low cost and reliable RF computer network, having a low power consumption, as in the case when powered by batteries.

The description above is intended, however, to include all such modifications and alterations insofar as they come within the scope of the appended claims or the equivalents thereof.

What is claimed is:

1. A method for managing the routing in a multi-hop network, the method comprising the steps of:

Having a node with a micro-controller means, a RF transceiver means, data storage means, a network interface means with an input buffer, output buffer and auxiliary buffer and a serial device communication means;

Having the data storage means store a plurality of node addresses and configuration data forming an address table;

Having a plurality of serial devices;

Having the messages contain a header at the beginning of the message with the fields sender node address, transmitter node address, receiver node address and destination node address;

Processing a message to a node from the serial device to network by receiving the message from the serial device, storing the message in the input buffer, copying the message to the output buffer, and transmitting the message to the network;

Processing a message to a node from a serial device to the same serial device by receiving the message from the serial device, storing the message in the input buffer, copying the message is copied to the output buffer and transmitting the message to the serial device;

Processing a message to a node from the network to a serial by receiving the message from the input buffer, storing the message the auxiliary buffer, copying the message to the output buffer, and transmitting the message to the serial device;

Processing a message to a node from the network to the network by receiving the message from the input buffer, storing the message the auxiliary buffer, copying the message to the output buffer, and transmitting the message to the network;

Processing a message by having a sender node send the message, having a plurality of nodes receive and retransmit the message until the destination node receives the message;

Processing a message from the network to a node by comparing the node's address with the destination node address; if the address does not match, the message is a retransmission message and the node searches for the next node and retransmits the message, if the address matches, the message is tested to determine if the message is a network command, if the message is a network command, the network command will be executed by the node, if the message is not a network command, the message is sent to the serial device, if an acknowledgement is required the node sends a request response message to the serial device, after the node receives the acknowledgement from serial device the node sends an acknowledgement to the sender node;

having said network interface means consists of an input buffer and an output buffer located internal on the microcontroller means;

having said header contains the fields sender node address, transmitter node address, receiver node address, destination node address, length, frame tag, data string and cyclic redundancy check; and having a sender first node send its update address table to a plurality of other node, then having said neighborhood nodes send acknowledge messages to the sender, having said sender sort said plurality of nodes by their addresses, then having said sender requiring of each one of the plurality of nodes its node address table in order to complete the entire network, if a node does not send an acknowledgement message, it will then appear as a node behind another node, correcting this error condition when said node and another node exchange messages between them and when said the sender first node has a complete table, having said sender first node send messages to each node in the network to include its address in others' node address tables.

2. The method of claim 1 in which said microcontroller means is an 8-bit micro-controller.

3. The method of claim 1 in which said serial device is a DSU.

4. The method of claim 1 in where each node has one DSU.

5. The method of claim 1 in which each node has two interfaces; one interface is node to serial device and one interface is a to the net, with an input buffer and an output buffer.

* * * * *